(12) United States Patent
Knifton et al.

(10) Patent No.: US 6,576,802 B2
(45) Date of Patent: Jun. 10, 2003

(54) ONE-STEP PRODUCTION OF 1, 3-PROPANEDIOL FROM ETHYLENE OXIDE AND SYNGAS WITH A CATALYST WITH A PHOSPHOLANOALKANE LIGAND

(75) Inventors: John Frederick Knifton, Houston, TX (US); Talmadge Gail James, Controe, TX (US); Kevin Dale Allen, Prairieville, LA (US); Paul Richard Weider, Houston, TX (US); Joseph Broun Powell, Houston, TX (US); Lynn Henry Slaugh, Houston, TX (US)

(73) Assignee: Shell Oil Company, Houston, TX (US)

( * ) Notice: Subject to any disclaimer, the term of this patent is extended or adjusted under 35 U.S.C. 154(b) by 0 days.

(21) Appl. No.: 10/158,452

(22) Filed: May 30, 2002

(65) Prior Publication Data
US 2003/0055298 A1 Mar. 20, 2003

Related U.S. Application Data

(60) Provisional application No. 60/295,769, filed on Jun. 4, 2001.

(51) Int. Cl.$^7$ ............................. C07C 27/00; C07C 29/00
(52) U.S. Cl. ............................................ 568/867
(58) Field of Search ........................ 568/867, 862; 502/325, 326, 327, 328, 329, 110, 104; 556/13, 14, 15, 16

(56) References Cited

U.S. PATENT DOCUMENTS

| | | | |
|---|---|---|---|
| 3,456,017 A | 7/1969 | Smith et al. | 260/602 |
| 3,463,819 A | 8/1969 | Smith et al. | 260/602 |
| 3,687,981 A | 8/1972 | Lawrence et al. | 260/340.7 |
| 5,256,827 A | 10/1993 | Slaugh et al. | 568/454 |
| 5,304,686 A | 4/1994 | Slaugh et al. | 568/496 |
| 5,304,691 A | 4/1994 | Arhancet et al. | 568/867 |
| 5,344,993 A | 9/1994 | Slaugh et al. | 568/454 |
| 5,459,299 A | 10/1995 | Cheng | 219/267 |
| 5,463,144 A | 10/1995 | Powell et al. | 568/867 |
| 5,463,145 A | 10/1995 | Powell et al. | 568/867 |
| 5,463,146 A | 10/1995 | Slaugh et al. | 568/862 |
| 5,545,765 A | 8/1996 | Slaugh et al. | 568/862 |
| 5,545,766 A | 8/1996 | Powell et al. | 568/862 |
| 5,545,767 A | 8/1996 | Weider et al. | 568/867 |
| 5,563,302 A | 10/1996 | Weider et al. | 568/862 |
| 5,689,016 A | 11/1997 | Weider et al. | 568/862 |

FOREIGN PATENT DOCUMENTS

| | | |
|---|---|---|
| WO | WO 91/14299 A1 | 1/2001 |
| WO | WO 01/072675 A2 | 4/2001 |

OTHER PUBLICATIONS

U.S. patent application Ser. No. 10/146,675, Knifton et al., filed May 15, 2002.
U.S. patent application Ser. No. 10/146,590, Knifton et al., filed May 15, 2002.
U.S. patent application Ser. No. 09/808,974, Knifton et al., filed Mar. 15, 2001.
U.S. patent application Ser. No. 09/963,068, Allen et al., filed Sep. 25, 2001.

*Primary Examiner*—Samuel Barts
*Assistant Examiner*—Elvis O. Price
(74) *Attorney, Agent, or Firm*—Donald F. Haas

(57) ABSTRACT

Disclosed is a novel class of modified ruthenium catalysts useful in the one step synthesis of 1,3-PDO comprising (a) a cobalt component comprising one or more non-ligated cobalt compounds; and (b) a ruthenium component comprising in major part a ruthenium carbonyl compound ligated with a phospholanoalkane ligand, solubilized in an ether solvent, that provides potential improvements in cost and performance in one step hydroformylation/hydrogenation. For example, cobalt-ruthenium-bidentate, bis(phospholano)alkane catalyst precursors in ether solvents provide good yields of 1,3-PDO in a one step synthesis.

5 Claims, 2 Drawing Sheets

ONE-STEP PRODUCTION OF 1,3-PROPANEDIOL FROM ETHYLENE OXIDE AND SYNGAS WITH A CATALYST WITH A PHOSPHOLANOALKANE LIGAND

This application claims the benefit of U.S. Provisional Application No. 60/295,769 filed Jun. 4, 2001, the entire disclosure of which is hereby incorporated by reference.

FIELD OF INVENTION

This invention relates to the synthesis of an aliphatic 1,3-diol, particularly 1,3-propanediol, from ethylene oxide and syngas in one step. More particularly this invention relates to a catalyst that provides good yields under mild conditions in the one-step synthesis of 1,3-propanediol and demonstrates advantages with respect to cost and performance. The catalyst of the invention comprises a homogeneous bimetallic cobalt-ruthenium catalyst in combination with a class of bis(phospholano)alkane ligands, solubilized in an ether solvent.

BACKGROUND OF THE INVENTION

Aliphatic 1,3-diols, particularly 1,3-propanediol, have many applications as monomer units for polyester and polyurethane, and as starting materials for the synthesis of cyclic compounds. For example, CORTERRA® polymer is a polyester characterized by outstanding properties that is made of 1,3-propanediol (hereafter 1,3-PDO) and terephthalic acid. There is much interest in the art in finding new routes for synthesizing 1,3-PDO that are efficient, economical, and demonstrate process advantages.

U.S. Pat. Nos. 3,463,819 and 3,456,017 teach the hydroformylation of ethylene oxide to produce 1,3-propanediol and 3-hydroxypropanal (hereafter 3-HPA) using a tertiary phosphine-modified cobalt carbonyl catalyst.

U.S. Pat. No. 5,304,691, assigned to Shell, discloses a method of hydroformylating ethylene oxide to 3-hydroxypropanal and 1,3-propanediol in a single step using an improved catalyst system comprising a cobalt-tertiary phosphine ligand in combination with a ruthenium catalyst. In '691, 1,3-PDO and 3-HPA are produced by intimately contacting an oxirane, particularly ethylene oxide (hereafter EO), a ditertiary phosphine-modified cobalt carbonyl catalyst, a ruthenium catalyst promoter, and syngas (carbon monoxide and hydrogen) in an inert reaction solvent at hydroformylation reaction conditions. A PDO yield of up to 86–87 mole % is reported, using a catalyst comprising cobalt ligated with 1,2-bis(9-phosphabicyclononyl)ethane as bidentate ligand, and either triruthenium(0) dodecacarbonyl or bis[ruthenium tricarbonyl dichloride] as cocatalyst. Also see U.S. Pat. No. 5,304,686 which discloses the synthesis of 3-hydroxypropanal using a ditertiary phospine-modified cobalt carbonyl catalyst and a catalyst promoter.

The production of 1,3-PDO in one step with minimal impurities and byproducts involves recycle and requires a catalyst system with good stability both during 1,3-PDO synthesis and during product recovery and recycle. It is desirable in the art to identify alternative catalyst systems that demonstrate potential advantages in the one-step production of 1,3-PDO.

SUMMARY

In accordance with the foregoing, the present invention provides a new class of ligands for use in a hydroformylation/hydrogenation catalyst composition. The ligands of the present invention provide potential advantages with respect to cost and performance. The invention is a catalyst complex comprising:

a) A cobalt component consisting essentially of one or more non-ligated cobalt compounds; and b) A ruthenium component comprising in major part a ruthenium carbonyl compound ligated to a phospholanoalkane ligand.

The novel oxirane hydroformylation catalyst of the present invention involves a complex that is postulated to be a cobalt-ruthenium-phospholanoalkane complex. One characterizing feature of the new catalyst is the use of a phospholanoalkane ligand ligated to ruthenium rather than cobalt, as is the case in U.S. Pat. No. 5,304,691. A number of phospholanoalkane ligands are effective, particularly bidentate, bis(phospholano)alkanes.

The invention also provides a one step process for preparing a 1,3-diol, comprising the reaction of an oxirane with syngas at hydroformylation conditions in an inert solvent in the presence of the catalyst complex of this invention.

DETAILED DESCRIPTION OF THE INVENTION

Figure 1:
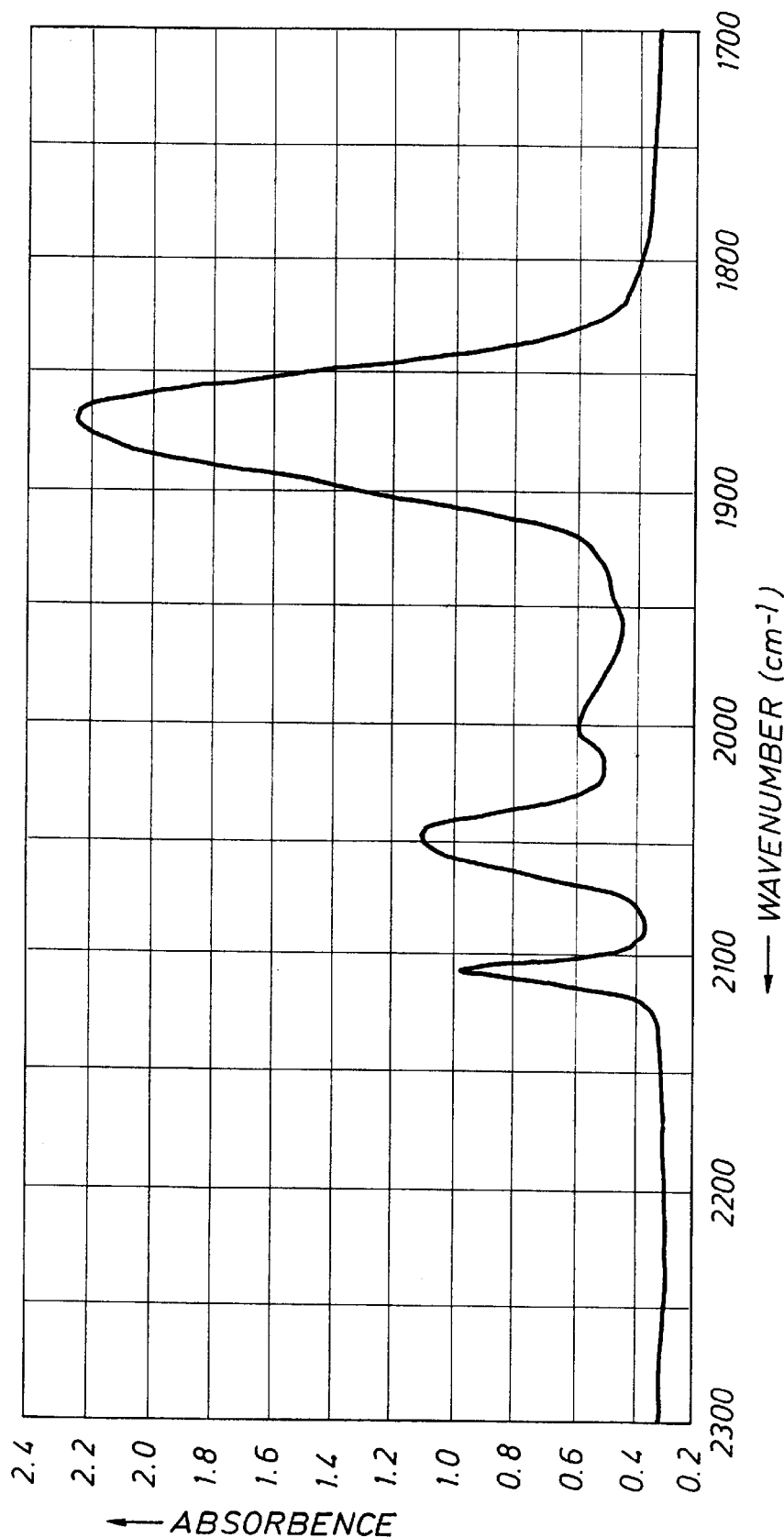
FIG. 1 is a typical IR spectrum of the cobalt-ruthenium-1,2-bis[(2R, 5R)-2,5-dimethylphospholano]ethane (BDMPE) catalyst during the one-step conversion of EO to 1,3-PDO synthesis, where the initial Co-Ru-BDMPE ratios are 1:0.67:1.2.

The selective hydroformylation/hydrogenation of ethylene oxide to 1,3-PDO in one step, represented by:

has been demonstrated using a bimetallic cobalt-ruthenium homogeneous catalyst system in combination with a class of bis(phospholano)alkane ligands, solubilized in an inert reaction solvent. For example, a cobalt-ruthenium-1,2-bis(2,5-dimethylphospholano)ethane catalyst solubilized in methyl tert-butyl ether (MTBE) can provide up to 70 mole % yield of 1,3-PDO, basis EO charged, during its generation from EO plus syngas.

Generally the one-step process for synthesizing 1,3-PDO comprises intimately contacting ethylene oxide, carbon monoxide and hydrogen (syngas), and a bimetallic catalyst in a liquid-phase solution in an inert reaction solvent at a temperature of from about 30 to 150° C., and an elevated pressure, preferably 100 to 4000 psi. In this chemistry important factors include efficient PDO recovery from the crude oxonated product solutions, and recycle of the active bimetallic catalyst complex.

In the present invention the 1,3-diols are made by charging an oxirane, Co—Ru-phospholanoalkane complex, reaction solvent, and optional cocatalyst and/or catalyst promoter to a pressure reactor with the introduction of syngas (a mixture of hydrogen and carbon monoxide), suitably in a molar ratio of $H_2$:CO of 1:1 to 8:1, preferably 2:1 to 6:1, under hydroformylation conditions.

The process of the present invention may be carried out as a batch-type process, continuous process, or a mixture thereof.

In the preferred embodiment of the present invention separate, combined or staged streams of EO, syngas and catalyst are charged to a reaction vessel, which can be a pressure reaction vessel such as a bubble column or a stirred autoclave, operated batch-wise or in a continuous manner.

Oxiranes of up to 10 carbon atoms, preferably up to 6 carbon atoms, and ethylene oxide in particular may be converted into their corresponding 1,3-diols by the hydroformylation reaction with syngas in the presence of the catalyst complex of the present invention.

An essential part of the present invention is the use of the Co—Ru-phospholanoalkane complex. The complex of the present invention is believed to comprise a novel class of ruthenium-modified catalysts. The characterizing feature of this novel class involves an oxidized ruthenium metal that is ligated to a phospholanoalkane ligand, with a cobalt compound as the counter ion.

The oxidation state of the ruthenium atom is not entirely certain (in theory, ruthenium may have a valence of 0 to 8), and may even change during the course of the hydroformylation reaction. Accordingly, the molar ratio of ruthenium to cobalt may vary within relatively broad ranges. Sufficient cobalt (0) should be added to completely oxidize all of the complexed ruthenium employed. An excess of cobalt can be added, but is not of particular value. Suitably, the molar ratio of Ru:Co may vary from 4:1 to 1:4, preferably from 2:1 to 1:4, more preferably from 1:1 to 1:2.

A number of phospholanoalkane ligands have been identified as effective for the one step PDO synthesis using the cobalt-ruthenium catalyst couple. Suitable phospholanoalkanes include phospholane substituted alkane compounds of formula I and II as follows:

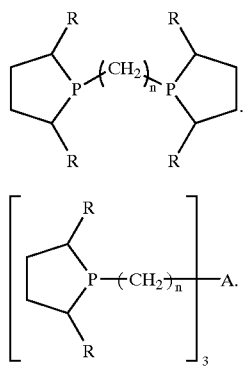

where, in both Formula I and II, R is a lower alkyl, trifluoromethyl, phenyl, substituted phenyl, aralkyl, or ring-substituted aralkyl; and n is an integer from 1 to 12; and for formula II, A is $CCH_3$ CH, N or P. Preferred are compounds of formula I and II wherein R is a lower alkyl of $C_1$ to $C_6$ alkyl and n is 1 to 3. Most preferred are those compounds of formula I and II wherein R is methyl and n is 1 to 3.

Examples of such compounds include, but are not limited to, 1,2-bis(phospholano)ethane, 1,2-bis(2,5-dimethylphospholano)ethane, 1,2-bis[(2R, 5R)-2,5-dimethylphospholano]ethane; 1,2-bis[(2S, 5S)-2,5-dimethylphospholano]ethane; 1,3-bis(2,5-dimethylphospholano)propane; tris[(2,5-dimethylphospholano)methyl]methane; tris[(2,5-dimethylphospholano)ethyl]amine; and 1,1,1-tris[(2,5-dimethylphospholano)ethyl]ethane.

Particularly useful, as demonstrated in the examples, in the present invention are bidentate, bis(phospholano)alkanes such as, for example, 1,2-bis[(2R, SR)-2,5-dimethylphospholano]ethane (BDMPE), 1,2-bis[(2S, 5S)-2,5-dimethylphospholano]ethane, a racemic mixture of the two, plus 1,2 bis(phospholano)ethane.

Suitable cobalt sources include salts that are reduced to the zero valence state by heat-treatment in an atmosphere of hydrogen and carbon monoxide. Examples of such salts comprise, for instance, cobalt carboxylates such as acetates, octanoates, etc., which are preferred, as well as cobalt salts of mineral acids such as chlorides, fluorides, sulfates, sulfonates, etc. Operable also are mixtures of these cobalt salts. It is preferred, however, that when mixtures are used, at least one component of the mixture be a cobalt alkanoate of 6 to 12 carbon atoms. The reduction may be performed prior to the use of the catalysts, or it may be accomplished simultaneously with the hydroformylation process in the hydroformylation zone. The counter ion, for best results, is believed to be the cobalt tetracarbonyl anion, $[Co(CO)_4]^-$, having a characteristic IR band in the region 1875 to 1900 $cm^{-1}$, particularly in the region 1888 $cm^{-1}$. However, this ion in the active catalyst can be a modification thereof. Cobalt carbonyls can be generated by reaction of the starting cobalt source such as cobalt octanoate with synthesis gas.

The molar stoichiometry ratio of cobalt:ruthenium: phospholanoalkane ligand is suitably in the range of 0.5 to 4 moles cobalt: 0.25 to 2 moles ruthenium: 0.4 to 3 moles phospholanoalkane ligand. A preferred range would be about 1 to 3 moles cobalt: 0.3 to 1.5 moles ruthenium: 0.5 to 2 moles phospholanoalkane ligand. A formulation that worked well, for example, was cobalt: ruthenium:1,2-bis(2, 5-dimethylphospholano)ethane in molar stoichiometry of 1:0.67:1.2, respectively. Unligated ruthenium carbonyl is believed to be far less effective, and the catalyst preparation therefore seeks to ligate each ruthenium atom. It is preferred that the molar ratio of ruthenium to cobalt be from 1:4 to 4:1.

In the present invention, the preferred method of preparing the cobalt-ruthenium-phospholanoalkane complex is the self-assembly method, wherein all catalyst components are brought together at the same time. As demonstrated in Example 1, the cobalt-ruthenium-phospholanoalkane complexes may be generated by self-assembly, in one step, when solubilized in a suitable ether solvent under synthesis gas conditions. The conditions and, in particular, the solvent, are selected such as to favor the formation of a ligated ruthenium species, rather than a ligated cobalt species. The presence of the Ru-ligated species rather than the Co-ligand species may be confirmed by e.g. IR analysis.

Also within the scope of the invention is the stepwise or sequential design preparation of the catalyst as follows. The first step in the stepwise preparation is synthesis of the Ru-phospholanoalkane complex. This may be done by bringing a suitable ruthenium source, e.g., triruthenium dodecacarbonyl in contact with the selected ligand. Alternatively, other readily available ruthenium carbonyl derivatives, such as ruthenium dicarbonyl acetate polymer and ruthenium(II) tricarbonyl dichloride, dimer may be employed instead of triruthenium dodecacarbonyl. Further alternatives include the use of less expensive ruthenium sources that, under a syngas atmosphere, will in-situ form ruthenium carbonyl species. These less expensive ruthenium sources may include, for example, ruthenium(IV) oxide, hydrate, ruthenium(III) chloride, and ruthenium-on-carbon.

The molar ratio of phospholanoalkane ligand to ruthenium may be about 4:1 to 1:2, preferably about 2:1.

The ruthenium-phospholanoalkane complex may, for instance, be made by reacting triruthenium dodecacarbonyl with a stoichiometric amount of a selected ligand in a solvent at a temperature within the range of 25 to 150° C., suitably 100 to 110° C., under a carbon monoxide or synthesis gas atmosphere, for 1 to 24 hours (i.e. until completion). At this point, optionally, said ruthenium-ligand complex may be isolated as a discrete material.

Next, in the stepwise method, the Ru-ligand complex is brought into contact with a suitable cobalt compound by means of a redox reaction to form the Ru—Co-ligand complex, again at the aforementioned (noncritical) conditions. A suitable cobalt source is cobalt octanoate, but other cobalt complexes and salts may be used as well. For instance, the selected cobalt octanoate, and optional promoters, if any, are added to the solution which is then maintained at the elevated temperature (from 25 to 150° C.) for a time of about 15 minutes to 24 hours. Again, optionally, the new cobalt-ruthenium-phospholanoalkane complex may be isolated and characterized.

Typically, whether said active Co—Ru-phospholanoalkane complex is generated by self assembly, or step-wise, it exhibits characteristic IR bands, particularly a strong cobalt carbonyl band in the region 1875 to 1900 $cm^{-1}$ due to the $[Co(CO)_4]^-$ anion, plus a series of three or four ruthenium-carbonyl bands in the 1900 to 2200 $cm^{-1}$ region that are postulated to be due to cationic ruthenium carbonyl species.

The conditions at which these compounds are allowed to form a complex are not critical. Temperature and pressure may vary within the ranges given below with respect to the hydroformylation reaction, for example 25 to 150° C. Syngas may be used as gas cap during the complex formation. It is preferable to use a solvent, preferably the solvent used in the hydroformylation reaction. Obviously, this solvent should be capable of dissolving the active catalyst, without affecting its properties. Suitable solvents include the ethers described below for use in the hydroformylation process, in particular branched alkyl ethers, such as, for example MTBE.

In the one step hydroformylation/hydrogenation using the catalyst composition of the present invention, the optimum ratio of oxirane in the feed to Co—Ru-ligand complex will, in part, depend upon the particular complex employed. However, molar ratios of oxirane to the cobalt within the Co—Ru-ligand complex from 2:1 to 10,000:1 are generally satisfactory, with molar ratios of from 50:1 to 500:1 being preferred.

Where the oxirane is EO, the EO will preferably be maintained throughout the reaction in a concentration not less than about 0.2% by weight, generally within the range of 0.2 to 20% by weight, preferably 1 to 10% by weight, based on the total weight of the reaction mixture.

The reaction solvent should be inert, meaning that it is not consumed during the course of the reaction. Ideal solvents for the invention process will solubilize the feed and products during the course of the reaction, but allow phase separation at reduced temperatures. Suitable solvents are described in U.S. Pat. No. 5,304,691 incorporated herein by reference in the entirety. Good results may be achieved with alkyl ethers, particularly branched alkyl ethers, and more particularly tertiary carbon atom-containing alkyl ethers. The solvent used to demonstrate the invention was methyl-tert-butyl ether.

Promoters may be employed. Suitable promoters are described in U.S. Pat. No. 5,304, 691, previously cited. Examples of promoters that work well, are readily available, and have demonstrated the promotion of EO conversion are tertiary amines such as N, N-dimethyldodecylamine and triethylamine, as well as alkali salts such as sodium acetate.

The components of the feed streams are contacted in a suitable reaction solvent in the presence of the catalyst complex of the present invention. The process of the invention can be carried out in a continuous mode, while maintaining said EO concentration, by for instance, staged EO addition.

For best results, the one step hydroformylation/hydrogenation is conducted under conditions of elevated temperature and pressure. Reaction temperatures range from 30 to 150° C., preferably from 50 to 125° C., and most preferably from 60 to 110° C.

The reaction pressure (total pressure, or partial pressure if inert gaseous diluents are used) should be at least 100 psi (690 kPa). A suitable operating pressure is in the range of 100 psi (690 kPa) to 4000 psi (27,580 kPa), preferably from 1000 psi to 2000 psi (6900 to 13,790 kPa), and most preferably about 1500 psi (10,340 kPa)±250 psi (1725 kPa). In a batch process, the reaction will generally be complete within 1 to 5 hours.

At the conclusion of the hydroformylation reaction, the 1,3-PDO is recovered from the product mixture by conventional methods such as selective extraction, fractional distillation, phase separation, selective crystallization, and the like. The unreacted starting materials as well as the catalyst and reaction solvent may, and preferably are, recycled for further use.

Partitioning of the reaction mixture can be promoted by the addition of a phase-split inducing agent. Suitable agents include glycols such as ethylene glycol and linear alkanes such as, for example, dodecane. Such an agent will be added to the reaction mixture in an amount within the range of about 2 to 10% by weight, preferably 4 to 8% by weight, based on the total reaction mixture. Alternate methods include addition of 1,3-propanediol into the reaction mixture to bring product concentration up to the target proportion. Also, miscibilizing alcohols and agents with similar polarity such as ethanol, propanol and isopropanol can be added initially, and then removed prior to the subsequent inducement of the phase separation.

Commercial operation will require efficient catalyst recovery with multiple cycles of essentially complete recycle of catalyst to the reaction. The preferred catalyst recovery process involves separation of the two liquid phase mixture noted previously and recycle of the bulk solvent phase to the reactor and return therewith of at least 60 to 90% by weight of the starting catalyst.

In a preferred manner of running the process, reaction conditions such as oxirane concentration, catalyst concentration, solvent, product concentration, reaction temperature and the like are selected so as to achieve a homogeneous reaction mixture at elevated temperatures and cause a partitioning of the reaction mixture into an upper solvent phase, containing much of the catalyst, and a lower phase containing most of the 1,3-propanediol, upon cooling the mixture. Such a partitioning facilitates isolation and recovery of product, recycle of catalyst, and removal of heavy ends from the solvent system. This process is referred to as a phase separation catalyst recycle/product recovery method.

In this process, the reactor contents are allowed to settle or are transferred to a suitable vessel at pressures ranging from atmospheric to near reaction pressure where, upon slight or considerable cooling, distinct phases may form that are substantially different, being considerably rich in 1,3-propanediol product, or in catalyst and solvent. The phase rich in cobalt-ruthenium-phospholanoalkane complex and solvent is directly recycled for further reaction with feed materials. Product 1,3-PDO is recovered from the product rich phase by conventional methods.

Formulations containing cobalt octanoate in combination with triruthenium dodecacarbonyl and bis(phospholano) alkane ligands provided one-step synthesis of 1,3-PDO when solubilized in suitable ether solvents. The cobalt octanoate-triruthenium dodecacarbonyl-1, 2-bis(2,5-dimethylphospholano)ethane catalyst precursors, solubilized in MTBE, allowed 1,3-PDO to be generated from EO plus syngas in greater than 70 mole % yields (basis EO charged). Here, hydroformylation is conducted at 90° C. and 1500 psi (10,340 kPa), using 4:1 ($H_2/CO$) gas. Typically, the liquid product comprises two phases, wherein the desired 1,3-PDO is concentrated in the heavier phase (B) (See "Phases" column of Tables). For this heavier phase, in Example 1, the estimated 1,3-PDO/HPA product ratio is ca. 52, the 1,3-PDO/EtOH ratio is 83, and the acetaldehyde content only 0.2%.

Figure 2:
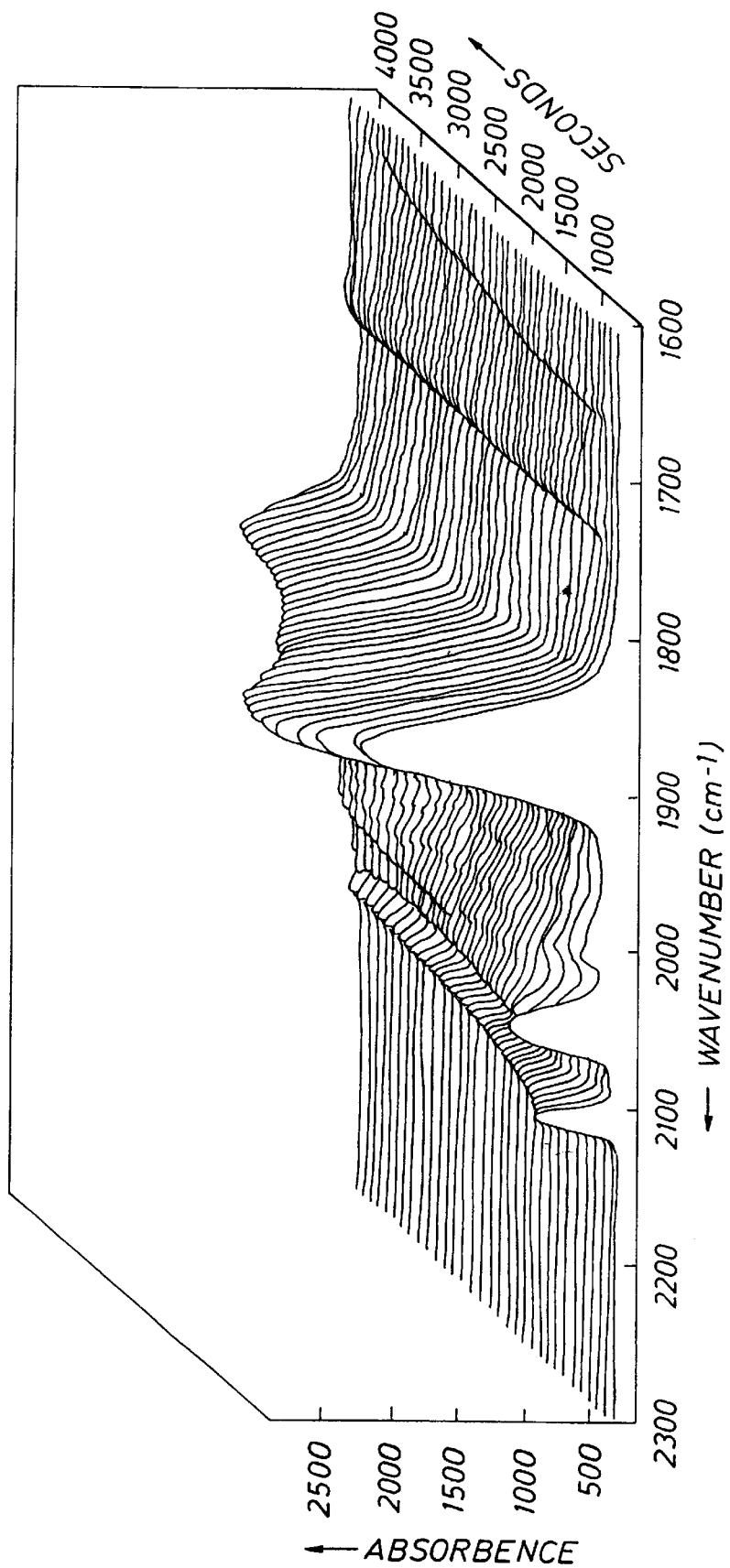
FIG. 2 is a cascade plot of the same cobalt-ruthenium-1,2-bis[(2R, 5R)-2,5-dimethylphospholano]ethane (BDMPE) catalyst during EO to 1,3-PDO synthesis.

Said oxonation-active solutions typically display certain signature infrared bands in the regions: 1850–1900 $cm^{-1}$, 1900–2200 $cm^{-1}$. These spectra are illustrated in FIGS. 1 and 2 for the Co—Ru-BDMPE system in MTBE during EO to 1,3-PDO synthesis. The PDO synthesis is illustrated in Example 15.

The addition of excess BDMPE to said Co—Ru catalyst solutions results in no significant 1,3-PDO production and no signature infrared bands in the 1900–2200 $cm^{-1}$ spectral regions (see Table 3, Example 16).

The following examples will serve to illustrate the invention disclosed herein. The examples are intended only as a means of illustration and should not be construed as limiting the scope of the invention in any way. Those skilled in the art will recognize many variations that may be made without departing from the spirit of the disclosed invention.

EXAMPLE 1

Preparation of 1,3-PDO

To a 100 ml, stirred, Parr autoclave, equipped with the necessary temperature and pressure controls was charged 228 mg (0.66 mmole) of cobalt octanoate, 207 mg (0.80 mmole) of 1,2-bis[(2R, 5R)-2,5-dimethylphospholano] ethane, 23 ml of dry, nitrogen-flushed methyl tert-butyl ether (MTBE), 93 mg (0.48 mmole Ru) of triruthenium dodecacarbonyl, and 17 mg (0.21 mmole) of sodium acetate. The autoclave was sealed and pressured to 1300 psi (8960 kPa) with 4/1($H_2$:CO) synthesis gas, and heated to 130° C. for three hours, with stirring, at 1500 psi (10,340 kPa). At this point, the reactor and contents were cooled to 5° C. and the gases vented. Ethylene oxide (3.6 gm, 82 mmole) was added to the reactor system and, after repressuring to 1300 psi (8960 kPa) with 4/1($H_2$:CO) syngas, the reactor was heated to 90° C., for 5–6 hours at 1500 psi (10,340 kPa). Additional synthesis gas was supplied as needed.

After cooling to ca. 4° C., and venting, 21.07 gm of a two-phase liquid product was collected comprising 16.00 gm of a MTBE-solvent rich phase and 5.07 gm of a 1,3-propanediol rich phase. Analyses of these two product liquid phases (T and B), plus a subsequent water-wash (24.1 gm) of the reactor, by gc, showed a 1,3-PDO yield, basis EO charged, of 71 mole %. From further gc analyses of the heavier phase (B) it is concluded that the estimated PDO/HPA product ratio is ca. 52, the PDO/EtOH ratio is 83, and the acetaldehyde content is only 0.2%.

EXAMPLES 2–17

Examples 2 to 17 were carried out according to the procedures of Example 1. In these runs the cobalt-ruthenium homogeneous catalysts were used in association with a series of bis(phospholano)alkane ligands. Experimental summary data are provided in accompanying Tables 1–4, where W/W refers to a post water wash of the Parr reactor, and ND is not detected.

1,3-PDO syntheses have been demonstrated using:

a) A series of P-ligands, including 1,2-bis([(2R, 5R)-2,5-dimethylphospholano]ethane [BDMPE(R, R)], 1,2-bis [(2S, 5S)-2,5-dimethylphospholano]ethane [BDMPE (S,S)], their racemic mixture, as well as 1,2-bis (phospholano)ethane (BPE).

b) A range of cobalt:ruthenium:phospholano initial catalyst ratios.

c) A range of operating temperatures (80–100° C.), and pressures (500 to 1500 psi; 3550 to 10,340 kPa).

d) A range of synthesis gas (H2/CO) compositions.

TABLE 1

| Ex | Catalyst | Solvent | Temp °C. | Time (hrs) | EO Uptake wt (g) | Product Phases | Conc. (%) PDO | Conc. (%) HPA | PDO Production (mmole) | PDO Sel. (%) | PDO Yield (mole %) |
|---|---|---|---|---|---|---|---|---|---|---|---|
| 2 | Co—$Ru_3(CO)_{12}$—BDMPE(R,R) (1:0.44:1) | MTBE | 100 | 4 | 17.2 3.7 | T B W/W | 2.3 44.9 6.3 | 1.7 16.3 3.4 | 7.8 19.4 3.4 30.6 | 35 61 | 38 |
| 3 | Co—$Ru_3(CO)_{12}$—BDMPE(R,R) (1:0.67:1.21) | MTBE | 100 | 4 | 16.8 4.7 | T B W/W | 2.7 54.7 7.9 | 0.9 7.6 1.9 | 8.7 31.7 5.1 45.5 | 46 78 | 51 |
| 4 | Co—$Ru_3(CO)_{12}$—BDMPE(R,R) (1:0.88:1.47) | MTBE | 100 | 4.25 | 17.1 4.2 | T B W/W | 2.7 58.1 6.6 | 0.4 5.3 N.D. | 8.7 28.8 4.1 41.6 | 53 81 | 48 |
| 5 | Co—$Ru_3(CO)_{12}$—BDMPE(R,R) (1:0.67:1.21) | MTBE | 100 | 3.75[a] | 16.9 3.6 | T B W/W | 2.4 55.0 9.4 | 1.1 9.5 3.0 | 6.1 20.5 7.2 33.8 | 42 75 | 40 |

TABLE 1-continued

| Ex | Catalyst | Solvent | Temp °C. | Time EO Uptake (hrs) | Product Phases | wt (g) | Conc. (%) PDO | Conc. (%) HPA | PDO Production (mmole) | PDO Sel. (%) | PDO Yield (mole %) |
|---|---|---|---|---|---|---|---|---|---|---|---|
| 6 | Co—Ru$_3$(CO)$_{12}$—BDMPE(R,R) (1:0.67:1.21) | MTBE | 80 | 5+[a] | T<br>B<br>W/W | 12.9[b]<br>4.9 | 3.0<br>61.8<br>5.7 | 0.5<br>67.0<br>N.D. | 6.1[b]<br>37.3<br>3.4<br><br>46.8 | 63<br>84 | 56 |
| 7 | Co—Ru$_3$(CO)$_{12}$—BDMPE(R,R)[b] | MTBE | 80 | 6[a] | T<br>B<br>W/W | 16.3<br>4.7 | 2.2<br>62.4<br>6.0 | 0.4<br>6.8<br>1.1 | 8.5<br>33.7<br>4.1<br><br>46.3 | 62<br>85 | 56 |

[a]Use 2:1 H$_2$/CO Gas
[b]Repeat of Example 6

TABLE 2

| Ex | Catalyst | Solvent | Temp °C. | Time EO Uptake (hrs) | Product Phases | wt (g) | Conc. (%) PDO | Conc. (%) HPA | PDO Production (mmole) | PDO Sel. (%) | PDO Yield (mole %) |
|---|---|---|---|---|---|---|---|---|---|---|---|
| 8 | Co—Ru$_3$(CO)$_{12}$—BDMPE(S,S) (1:0.67:1.21) | MTBE | 80 | 6[a] | T<br>B<br>W/W | 17.3<br>4.0 | 2.1<br>61.7<br>3.9 | 0.5<br>7.6<br>1.1 | 7.5<br>29.1<br>2.5<br><br>39.1 | 65<br>83 | 45 |
| 9 | Co—Ru$_3$(CO)$_{12}$ BDMPE(R,R) (1:0.44:0.2) | MTBE | 100 | 1.25[a] | P<br>W/W | 20.5 | N.D.<br>N.D. | 1.4<br>N.D. | N.D.<br>N.D.<br><br><0.1 | | <0.1<br><0.1 |
| 10 | Co—Ru$_3$(CO)$_{12}$—BDMPE(R,R) (1:0.67:1.21) | MTBE | 80 | 6[b] | T<br>B<br>W/W | 16.0<br>5.6 | 2.2<br>72.6<br>4.5 | N.D.<br>1.4<br>N.D. | 7.3<br>48.2<br>2.9<br><br>58.4 | 75<br>95 | 71 |
| 11 | Co—Ru$_3$(CO)$_{12}$—BDMPE(R,R)[c] (1:0.67:1.21) | MTBE | 80 | 5[b] | T<br>B<br>W/W | 16.3<br>4.7 | 1.9<br>65.2<br>9.7 | 0.2<br>5.4<br>N.D. | 71.0<br>37.1<br>6.4<br><br>50.6 | 63<br>89 | 60 |
| 12 | Co—Ru$_3$(CO)$_{12}$—BDMPE(R,R) (1:0.67:1.21) | MTBE | 80 | 4.25[d] | T<br>B<br>W/W | 16.4<br>4.8 | 1.3<br>58.8<br>8.3 | 0.4<br>6.6<br>1.6 | 3.7<br>30.9<br>5.6<br><br>40.2 | 46<br>78 | 47 |
| 13 | Co—Ru$_3$(CO)$_{12}$—BDMPE(R,R) (1:0.67:1.21) | MTBE | 80 | 0.75[e] | T<br>B<br>W/W | 19.7<br>0.4 | 3.9<br>61.8<br>3.7 | 0.3<br>2.6<br>N.D. | 8.1<br>2.2<br>2.4<br><br>12.7 | 69<br>80 | 15 |

[a]Use 2:1 H$_2$/CO Gas
[b]Use 4:1 H$_2$/CO Gas
[c]Repeat of Example 10
[d]Use 4/1 H$_2$/CO at 1000 psi (6900 kPa)
[e]Use 4/1 H$_2$/CO at 500 psi (3550 kPa)

TABLE 3

| Ex | Catalyst | Solvent | Temp °C. | Time EO Uptake (hrs) | Product Phases | wt (g) | Conc. (%) PDO | Conc. (%) HPA | PDO Production (mmole) | PDO Sel. (%) | PDO Yield (mole %) |
|---|---|---|---|---|---|---|---|---|---|---|---|
| 14 | Co—Ru$_3$(CO)$_{12}$—1,2 BDMPE (RACEMIC) (1:0.67:1.21) | MTBE | 80 | 6[a] | T<br>B<br>W/W | 16.6<br>3.6 | 1.3<br>63.8<br>8.1 | 0.3<br>8.6<br>1.7 | 5.8<br>26.0<br>5.2<br><br>37.0 | 54<br>83 | 48 |

TABLE 3-continued

| Ex | Catalyst | Solvent | Temp °C. | Time EO Uptake (hrs) | Product Phases | wt (g) | Conc. (%) PDO | Conc. (%) HPA | PDO Production (mmole) | PDO Sel. (%) | PDO Yield (mole %) |
|---|---|---|---|---|---|---|---|---|---|---|---|
| 15 | Co—Ru$_3$(CO)$_{12}$—BDMPE(R,R) (1:0.67:1.21) | MTBE | 80 | b | T<br>B | 17.0<br>2.0 | 1.7<br>60.3 | 0.5<br>11.9 | 8.1<br>19.2<br>27.3 | 59<br>78 | 70 |
| 16 | Co—Ru$_3$(CO)$_{12}$—BDMPE(R,R) (1:0.67:3.64) | MTBE | 80 | b | P | 17.4 | <0.1 | N.D. | <1 | <1 | <0.1 |

$^a$Use 4:1 H$_2$/CO Gas
$^b$Run in IR cell

TABLE 4

| Ex | Catalyst | Solvent | Temp °C. | Time EO Uptake (hrs) | Product Phases | wt (g) | Conc. (%) PDO | Conc. (%) HPA | PDO Production (mmole) | PDO Sel. (%) | PDO Yield (mole %) |
|---|---|---|---|---|---|---|---|---|---|---|---|
| 17 | Co—Ru$_3$(CO)$_{12}$—1,2 BPE (1:0.67:1.21) | MTBE | 80 | 4$^a$ | T<br>B<br>W/W | 16.7<br>3.7 | 4.3<br>61.9<br>6.2 | N.D.<br>0.8<br>4.3 | 14.6<br>27.1<br>4.3<br>46.0 | 64<br>90 | 58 |

$^a$Use 4:1 H$_2$/CO Gas

We claim:

1. A process for preparing 1,3-propanediol comprising the steps of:
   (a) contacting, in a reaction mixture, ethylene oxide, carbon monoxide, hydrogen, an inert reaction solvent, and a catalyst composition comprising:
      (i) one or more non-ligated cobalt carbonyl compounds; and
      (ii) a ruthenium carbonyl compound ligated with a phospholanoalkane moiety; and
   (b) heating said mixture to a temperature within the range from 30 to 150° C. and a pressure of at least 100 psi (690 kpa) for a time effective to produce a two-phase reaction product mixture comprising an upper phase comprising a major portion of the solvent, at least 50 wt % of the catalyst composition, plus unreacted ethylene oxide, and a lower phase, which comprises a major portion of 1,3-propanediol.

2. The process of claim 1 wherein the hydrogen to carbon monoxide molar ratio is 1:1 to 8:1.

3. The process of claim 2 wherein the hydrogen to carbon monoxide molar ratio is 2:1 to 6:1.

4. The process of claim 1 further comprising that the complex is made by the self-assembly method wherein all the components are brought together at the same time under synthesis gas conditions.

5. The process of claim 1 further comprising that the complex is made stepwise wherein the ruthenium compound is reacted with a phospholanoalkane in the presence of syngas at a temperature in the range of 25 to 150° C. and subsequently caused to undergo a redox reaction with the cobalt compound at a temperature in the range of 25 to 150° C.

* * * * *